United States Patent [19]

Schlak et al.

[11] Patent Number: 4,481,341

[45] Date of Patent: Nov. 6, 1984

[54] THERMOSETTING ORGANOPOLYSILOXANE MIXTURES CONTAINING PLATINUM CATALYST DISPERSED IN SOLID SILICONE RESIN

[75] Inventors: Ottfried Schlak, Leverkusen; Werner Michel, Cologne; Bernard Munchenbach, Leverkusen, all of Fed. Rep. of Germany

[73] Assignee: Bayer Aktiengesellschaft, Leverkusen, Fed. Rep. of Germany

[21] Appl. No.: 404,289

[22] Filed: Aug. 2, 1982

[30] Foreign Application Priority Data

Aug. 11, 1981 [DE] Fed. Rep. of Germany ....... 3131734

[51] Int. Cl.$^3$ .............................................. C08L 83/06
[52] U.S. Cl. .................................. 525/478; 523/209; 523/211; 525/936; 528/15
[58] Field of Search ............... 523/211, 209; 525/478, 525/936; 528/15

[56] References Cited

U.S. PATENT DOCUMENTS

| | | | |
|---|---|---|---|
| 2,837,494 | 6/1958 | Gilbert et al. | 524/139 |
| 3,070,559 | 12/1962 | Nitzsche et al. | 523/211 |
| 3,790,515 | 2/1974 | Rosenbaum et al. | 523/211 |
| 3,983,298 | 9/1976 | Hahn et al. | 525/478 |
| 3,989,666 | 11/1976 | Niemi | 525/478 |
| 4,293,677 | 10/1981 | Imai | 525/478 |

FOREIGN PATENT DOCUMENTS 0015346 9/1980 European Pat. Off. .
2000165 1/1979 United Kingdom .

*Primary Examiner*—Wilbert J. Briggs, Sr.
*Attorney, Agent, or Firm*—Connolly and Hutz

[57] ABSTRACT

A thermosetting organopolysiloxane and organohydrogenpolysiloxane mixture contains a catalytic amount of platinum or a platinum compound finely dispersed in a solid substance at a concentration of 0.01–5% by weight calculated as platinum metal and based on the total weight of catalyst and solid substance, wherein the solid platinum-containing catalyst material has a melting point or softening point between 70° and 250° C., is practically immiscible with the organopolysiloxane and organohydrogenpolysiloxane mixture below the melting point or the softening point, and is finely dispersible therein.

5 Claims, No Drawings

THERMOSETTING ORGANOPOLYSILOXANE MIXTURES CONTAINING PLATINUM CATALYST DISPERSED IN SOLID SILICONE RESIN

The present invention relates to platinum-catalysed thermosetting organopolysiloxane mixtures which can be cured by addition of hydrogen, which is bonded to Si, to an aliphatic multiple bond, the platinum catalyst being contained in a solid substance, the softening or melting point of which lies between 70° and 250° C., and which is dispersed in the rest of the mixture. Such organopolysiloxane mixtures show good storage stability at room temperature, and cure rapidly at temperatures above the softening or melting point of the solid substance which contains the catalyst.

Organopolysiloxane mixtures, which can be cured by addition of hydrogen, which is bonded to Si, to aliphatic multiple bonds, this addition being catalysed by platinum or platinum compounds, are well known (e.g. U.S. Patent Specification No. 2,823,218, (Union) priority date: 05.12.1955). They consist principally of an organopolysiloxane with at least two vinyl groups directly bonded to the silicon atoms of one molecule, an organohydrogenpolysiloxane with at least two hydrogen atoms directly bonded to the silicon atoms of one molecule, a platinum catalyst and possibly a filler and other additives.

These organopolysiloxane mixtures can, however, not be stored as a so-called one-component system for long periods without gelling. They frequently already begin the crosslinking reaction on mixing and turn to a gel within a few hours at room temperature.

Thus, it is customary with such organopolysiloxane mixtures, to combine the polysiloxane containing the vinyl groups, the filler and the platinum catalyst in one component and the hydrogen-containing polysiloxane in a second component. When the manufacturer or user of the material wants to prepare a cured product, he mixes the two components in specific proportions, puts the mixture in the desired mould and allows it to cure either at room temperature or at a raised temperature in periods of a few seconds up to several hours.

The mixtures described above are normally sold as two components and designated addition-crosslinking organopolysiloxane mixtures or platinum-catalysed polysiloxane mixtures. These types of mixtures can either be cured at room temperature over a relatively long period such as 1 to 12 hours after mixture of the two components or for a shorter time by heating to temperatures above 100° or 200° C.

After mixing the two components together and before solidification, it is desirable to have as long a pot life as possible, but at least a working time of 12 to 72 hours. In order to achieve this, numerous measures have been described, which all have the aim of delaying or inhibiting the catalytic activity of the platinum compound at room temperature, without decreasing the catalytic activity at higher temperatures.

This succeeds to some extent with complex platinum compounds which contain special ligands, such as acetylacetone, organic phosphorus or aminophosphine compounds, or which are prepared by special processes.

Such special platinum catalysts are described, for example, in the U.S. Patent Specification No. 3,188,300, U.S. Patent Specification No. 3,522,327, DE-OS (German Published Specification) 2,131,740, U.S. Patent Specification No. 3,723,497, DE-OS (German Published Specification) No. 2,539,239 and DE-OS (German Published Specification) No. 2,809,875.

To some extent, also, the curing reaction at room temperature is delayed by the addition of so-called inhibitors. The use of a large number of such compounds has been described, for example: e.g.: organic amine and amide compounds in U.S. Patent Specification No. 3,188,299, compounds with acetylenic bonds in U.S. Patent Specification No. 3,445,420, the use of perchloroethylenes as solvents in U.S. Patent Specification No. 3,383,356, SiVi-containing silazane compounds in U.S. Patent Specification No. 3,453,233, tetramethylguanidino carboxylate in DE-OS (German Published Specification) No. 1,900,968, Sn(II), Hg(II), Bi(II), Cu(I) and Cu(II) salts in DE-OS (German Published Specification) No. 1,900,969, organic sulphoxides in U.S. Patent Specification No. 3,453,234, benzotriazole in DE-OS (German Published Specification) No. 1,926,575, siloxane copolymers rich in vinyl groups in DE-OS (German Published Specification) No. 2,040,386, oxime compounds in DE-OS (German Published Specification) No. 2,210,380, ethylenic unsaturated isocyanurates (triallyl isocyanurate) in DE-OS (German Published Specification) No. 2,454,257, hydrazine compounds and organic peroxides in DE-OS (German Published Specification) No. 2,502,936, cyclic polymethylvinylsiloxanes in DE-OS (German Published Specification) No. 3,923,705, acrylonitrile in DE-OS (German Published Specification) No. 2,550,744, reaction products of hydrogen polysiloxanes and alcohols with acetylenic bonds in DE-OS (German Published Specifications) Nos. 2,529,781, 2,529,782, and in DE-OS (German Published Specification) No. 2,554,001, diaziridin in DE-OS (German Published Specification) No. 2,515,484, butynol in DE-OS (German Published Specification) No. 2,616,672, Mebutenol in DE-OS (German Published Specification) No. 3,989,668, reaction products from alcohols with acetylenic bonds and isocyanates in DE-OS (German Published Specification) No. 2,653,580, organic peroxides in U.S. Patent Specification No. 4,020,014, organic hydroperoxides in DE-OS (German Published Specification) No. 2,715,544, low molecular-weight siloxane oils with Me$_2$ViSiO$_{\frac{1}{2}}$ end groups in DE-OS (German Published Specification) No. 2,646,726, amido siloxane compounds in DE-OS (German Published Specification) No. 2,917,963,

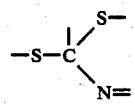

compounds in DE-OS (German Published Specification) No. 2,824,630 and tertiary amines in DE-OS (German Published Specification) No. 3,016,093.

When an inhibitor is used, the proportion of the inhibitor and the platinum catalyst must be exactly adjusted in order to obtain the intended retardation of the kinetics of crosslinking at low temperatures. In addition, the storage stability depends on the type of catalysed system, on the chemical nature of the inhibitor and of the platinum catalyst. Thus it is laborious and often extremely difficult to select the most suitable catalyst and inhibitor for the particular organopolysiloxane mixture in question and to employ them in the correct proportions to achieve the desired result.

Furthermore, the above-described inhibitors are sometimes substances which are toxic and foul-smelling, the preparation of which is sometimes difficult or even dangerous due to risk of explosion and these substances sometimes evaporate on curing and/or produce poisonous and foul-smelling (cleavage) products and/or impair the quality of the end product. Some of these inhibitors are relatively volatile at room temperature, so that air-tight containers are necessary for packaging the inhibited mixture. Evaporation of the inhibitor on the surface of the organopolysiloxane mixture can lead to premature curing at room temperature, to the formation of a skin or to deterioration of the surface properties of the end product. Deterioration of the surface properties can also come about due to the abrupt evaporation of these inhibitors on thermo-setting.

On the other hand, if noticeable amounts of these inhibitors or their cleavage products remain in the end product, this can lead not only to a visual olfactory and/or toxic impairment, but also to a poorer behaviour of the end product in case of fire.

Furthermore, non-, or only slightly volatile inhibitors can lead to insufficient setting on heating, or, depending on the layer thickness of the end product and the volatility of the inhibitor, to non-homogeneous curing.

In addition, the effectiveness of these inhibitors is sometimes too small, or the necessary dosing too high, to achieve satisfactory results in practice.

The object of the invention consists in creating an organopolysiloxane mixture of the type mentioned in the introduction which can be stored for relatively long periods without these disadvantages.

The invention relates to thermosetting organopolysiloxane mixtures, which can be cured by the addition of hydrogen, which is bonded to Si, onto an aliphatic multiple bond, and which contain:

1. An organopolysiloxane, or mixtures of such compounds, which contains in one molecule at least two aliphatic unsaturated monovalent hydrocarbon groups directly bonded to the silicon atoms, 2. An organohydrogenpolysiloxane, or mixtures of such compounds, which contains in one molecule at least two hydrogen atoms directly bonded to the silicon atoms, 3. Optionally, fillers, pigments, dispersing auxiliaries, adhesion-promoting auxiliaries and other additives and 4. A catalyst, particularly a catalytic amount of platinum or a platinum compound, characterised in that the platinum catalyst (4) is uniformly contained in a solid substance (5) at a concentration from 0.01–5%, calculated as the metal, the solid substance (6) containing the platinum catalyst having a melting point or softening point between 70° and 250° C., being practically insoluble in the mixture of components (1) and (2) below the melting or softening point, and being finely dispersible in this mixture.

Aliphatic multiple bonds can be present in the organopolysiloxane mixtures according to the invention, in the same compounds with aliphatic multiple bonds as in the hitherto known organopolysiloxane mixtures which can be cured by addition of hydrogen, which is bonded to Si, to an aliphatic multiple bond.

These organopolysiloxanes are mostly those composed of units of the general formula

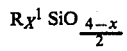

where
R¹ denotes identical or different monovalent optionally substituted hydrocarbon radicals, in each molecule at least 2 of the radicals $R^1$, preferably however at most 50% of the number of the radicals $R^1$, having aliphatic multiple bonds, and
x equals 0, 1, 2 or 3, but averages 0.75 to 3.0 inclusive.

The hydrogen which is bonded to Si can also be present in the materials according to the invention in the same compounds with hydrogen bonded to Si as in the hitherto known organopolysiloxane materials, which can be cured by addition of hydrogen, which is bonded to Si, to an aliphatic multiple bond. These compounds are mostly those composed of units of the general formula

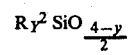

where
R² denotes hydrogen or identical or different monovalent optionally substituted hydrocarbon radicals, at least 2, preferably at least 3, hydrogen atoms bonded to Si being present per molecule of these compounds, and
y equals 0, 1, 2 or 3, preferably averaging at least 1, with the additional proviso, that at least as many organic radicals as hydrogen atoms bonded to Si are present in these units on average.

Hydrogen bonded to Si is present in the materials according to the invention preferably in amounts from 0.6 to 2.5 hydrogen atoms bonded to Si per aliphatic multiple bond.

The aliphatic multiple bond and hydrogen bonded to Si can be present in different forms or in one and the same form of organosilicon compound.

The optionally substituted hydrocarbon radicals $R^1$ and $R^2$ preferably contain 1 to 18 carbon atoms each. Examples of these hydrocarbon radicals $R^1$ and $R^2$, which have no aliphatic multiple bonds, are alkyl radicals, such as the methyl, ethyl, n-propyl and isopropyl radical and octadecyl radicals; cycloalkyl radicals, such as the cyclohexyl and cycloheptyl radical; aryl radicals, such as the phenyl radical; alkaryl radicals, such as tolyl radicals; and aralkyl radicals, such as the benzyl and the beta-phenylethyl radical. Examples of substituted hydrocarbon radicals $R^1$ and $R^2$, which have no aliphatic multiple bonds, which may be mentioned are halogenated hydrocarbon radicals, such as the 3,3,3-trifluoropropyl radical and o-, p- and m-chlorophenyl radicals, and cyanoalkyl radicals, such as the beta-cyanoethyl radical. Preferably at least 50% of the number of radicals $R^2$, which do not consist of hydrogen bonded to Si, and at least 50% of the number of radicals $R^1$, which do not have aliphatic multiple bonds, are methyl radicals, because of their ready availability.

Examples of hydrocarbon radicals $R^1$ and $R^2$ with aliphatic multiple bonds are the ethynyl, vinyl, allyl, methallyl, cyclopentenyl and butadienyl radical. The vinyl radical is preferred because of its relatively ready industrial availability.

The organopolysiloxanes can be resins, oils or rubbers or their mixtures or they can be copolymers.

If a resin is used, it is necessary for this to be as free as possible from compounds or molecular groups with active hydrogen atoms, in order to prevent the formation of hydrogen gas and consequent faults in the product after curing.

In addition to organosilicon compound(s) with hydrogen bonded to Si and an aliphatic multiple bond and a dispersion of a solid substance containing a catalyst, the thermosetting organopolysiloxane mixtures according to the invention can also contain substances which could be present also in the hitherto known organopolysiloxane mixtures, which can be cured by addition of hydrogen, which is bonded to Si, to an aliphatic multiple bond. Examples of such additional materials are fillers, such as pyrogenically produced silicon dioxide, precipitated silicic acid, powdered quartz, silicates, diatomaceous earth, clacium carbonate, glass fibres, materials which confer electric conductivity, such as carbon black or metal powders, pigments, soluble dyes, plasticisers, dispersing auxiliaries, agents for improving adhesion of the elastic or non-elastic products produced from the organopolysiloxane mixtures to the bases upon which these products have been produced, additionally flame-retarding additives and stabilisers against ageing at raised temperatures. These fillers can be reinforcing or non-reinforcing fillers, which can be those which have previously been treated with organochlorosilanes and those which, on mixing or before, have been treated with cyclosiloxanes, siloxanols, silazanes, alkoxysilanes or alkoxysiloxanes.

The organopolysiloxane mixtures according to the invention can also contain the same catalysts promoting the addition of hydrogen, which is bonded to silicon, to an aliphatic multiple bond, as could be present in the hitherto known organopolysiloxane materials, which can be cured by addition of hydrogen, which is bonded to Si, to an aliphatic multiple bond. Examples of such catalysts are metallic and finely divided platinum, ruthenium, phodium, palladium and iridium, these metals in each case being on carriers, such as silicon dioxide, aluminium oxide or active charcoal, and compounds or complexes of all these elements, such as platinum halides, e.g. $PtCl_4$, $PtCl_6.6H_2O$, $Na_2PtCl_4$ containing complexed water, platinum-olefine complexes, platinum-alcohol or platinum-alcoholate complexes, platinum-aldehyde complexes, platinum-vinyl-siloxane complexes, platinum-divinyltetramethyldisiloxane complexes, with or without a content of detectable halogen, bis-(gamma-picoline)-platinum dichloride and trimethylenepyridine platinum dichloride.

Platinum catalysts are preferred which are described in DE-AS (German Published Specification) No. 1,257,752 and U.S. Patent Specification No. 2,823,218.

Suitable solid, dispersible substances containing a platinum catalyst and having a melting or softening point between 70° and 250° C., are a number of materials which solidify to a glass or crystals. These include thermoplastics such as e.g. silicone resins or polyester resins the softening point of which lies between 70° and 250° C. and organic compounds such as e.g. octaphenylcyclotetrasiloxane, tribenzamide or triphenylphosphine oxide, which have a melting point between 70° and 250° C., or mixtures of these substances with a softening or melting point between 70° and 250° C.

Solid silicone resins are preferred, and particularly those which have aliphatic unsaturated monovalent hydrocarbon groups directly bonded to the silicon atom.

The preparation of the solid dispersible substances according to the invention, which have a melting point or softening point between 70° and 250° C. and contain a homogeneously distributed platinum catalyst, is carried out preferably by mixing a solution of the solid substance in a suitable organic solvent, such as e.g. toluene, with the appropriate amount of a platinum catalyst solution, such as, e.g. is described in the U.S. Patent Specification No. 2,823,218, and removing the solvent in vacuo from the resulting homogeneous solution with continuous mixing. In this way a solid is obtained which contains the platinum catalyst homogeously distributed. Before use, this solid is ground sufficiently finely and preferably graded through a sieve with a mesh of 100 $\mu$m. The resulting finely divided powder contains 0.01–5% of platinum, calculated as the metal, and is readily dispersible in the above polysiloxane compounds.

The abovementioned solid substances represent a selection, which can be extended according to need and intended use by a specialist.

The following features are essential in the sense of the invention:

The solid dispersed substance contained in the catalyst should immobilise the platinum catalyst at room temperature and only allow it to act on heating to 70° to 250° C.;

in the dispersed solid form, it should be practically immiscible with the above organopolysiloxane mixtures;

after melting or softening, it can be soluble in the above organopolysiloxanes and can optionally crosslink with these, without this being necessary according to the invention;

the solid substance, as also all other additives, should not contain a catalyst poison which would prevent vulcanisation on heating.

the solid substance should contain, if possible, few or no active hydrogen atoms which can react with the "SiH groups" in the sense of a side reaction with the formation of hydrogen;

the solid substance should be as stable to heat as possible, and it should not adversely affect the properties of the end product if possible;

the platinum catalyst can be dissolved or homogeneously dispersed in the solid substance, and it is only essential that the catalyst is immobilised in the solid substance at room temperature.

The preparation of the preferred solid silicone resins according to the invention is known and can be carried out, for example, as described in the following patent specifications: U.S. Patent Specification No. 2,482,276, German Patent Specification No. 958,702, U.S. Patent Specification No. 3,489,782 and DE-OS (German Published Specification) No. 2,832,945, or as described in G. H. Wagner et al., Industrial and Engineering Chemistry, 45, 367 (1953) and L. H. Vogt et al., Inorg. Chem., 2, 189 (1963).

The thermosetting organopolysiloxane mixtures according to the invention can be employed when it is desired to use thermosetting organopolysiloxane mixtures. Possible areas of application are e.g. elastomers, cast resins, varnishing or impregnating resins, moulding, embedding and sealing materials, adhesives, mould release and parting agents and coating agents.

In the following text, the invention is illustrated in more detail using examples. Stated percentages or parts refer, in each case, to the weight unless otherwise stated. In addition, Me denotes a methyl radical, Ph denotes a phenyl radical and Vi denotes a vinyl radical.

Preparation of a solid silicone resin

A mixture of 124 parts of $PhSiCl_3$ (60 mol %), 43.8 parts of $MeSiCl_3$ (30 mol %) and 13.8 parts of $MeViSiCl_2$ (10 mol %) is added to a mixture of 471 parts of distilled $H_2O$, 123 parts of xylene and 41 parts of n-butanol in 30 minutes with rapid stirring and cooling; thereafter the mixture is allowed to settle, is separated, neutralised with 5% strength $NaHCO_3$ solution, washed with distilled $H_2O$, filtered and the solvent is distilled off, initially at 50 mbar up to 150° C. bottom temperature, thereafter at 3 mbar up to 150° C. bottom temperature. Subsequently, the liquid resin is poured into a shallow container and allowed to solidify. The clear transparent resin is broken up and dried for 6 hours at 70° C. and 30 mbar.

The resulting brittle silicone resin has a softening point of 103° C., measured by DIN 53,180.

Preparation of a solid substance containing a platinum catalyst 100 parts of the solid silicone resin described above are dissolved in 50 parts of toluene, and 10 parts of a platinum catalyst solution in iso-propanol are added to this solution. The catalyst solution contained 1% of Pt, calculated as the metal, and had been prepared according to U.S. Patent Specification No. 2,823,218. The resulting pale yellowish liquid is placed in a vacuum evaporator, and the solvent is removed over 12 hours at 70° C. and 30 mbar. The clear yellowish solid resin obtained is broken up and dried a further 12 hours at 70° C. and 30 mbar. After cooling, it is ground and passed through a sieve with a mesh of 100 μm. A white powder is obtained, which melts to a clear liquid, has a softening point, measured by DIN No. 53,180, of 105° C., and which contains 0.1% of platinum catalyst, calculated as the metal.

EXAMPLE 1

An organopolysiloxane mixture A was prepared by mixing 55 parts of a polydimethylsiloxane having vinyl end groups, 15 parts of a silicone resin having vinyl groups (and consisting of: $SiO_2$, $MeSiO_{3/2}$, $PhSiO_{3/2}$, $Me_2SiO$, $Me_3SiO_{\frac{1}{2}}$ and $Me_2ViSiO_{\frac{1}{2}}$ units), 27 parts of powdered quartz and 3 parts of pyrogenic $SiO_2$. An organopolysiloxane mixture B was prepared by mixing 50 parts of an organohydrogenpolysiloxane (consisting of: $SiO_2$, $MeSiO_{3/2}$, $MeHSiO$, $Me_2SiO$ and $Me_3SiO_{\frac{1}{2}}$ units), 25 parts of a polydimethylsiloxane having vinyl end groups and 25 parts of powdered quartz.

An organopolysiloxane mixture C was prepared by mixing 85 parts of the above mixture A, 15 parts of the above mixture B and 1.42 parts of the sieved silicone resin powder containing platinum catalyst, described above. Finally, silicone resin powder was mixed in, a temperature of 50° C. not being exceeded. The organopolysiloxane mixture C so prepared had a viscosity of 93,000 mPas at 23° C. and contained 20 ppm of platinum catalyst, calculated as platinum.

A test sample prepared from this was cured for 20 minutes at 175° C., and then had a hardness (Shore A) of 61.

After storing for 5 weeks at 23° C., the organopolysiloxane mixture C was practically unchanged. The viscosity was 95,000 mPas at 23° C. and, a test sample cured for 20 minutes at 175° C. had a hardness (Shore A) of 62.

COMPARISON EXPERIMENT 1

An organopolysiloxane mixture A of the same composition as in Example 1 was prepared, and mixed with 33.6 ppm of a dissolved platinum catalyst calculated as the metal.

The platinum catalyst had been prepared in accordance with U.S. Patent Specification No. 3,775,452.

An organopolysiloxane mixture C was prepared by mixing 85 parts of the above catalysed mixture A, 15 parts of mixture B (prepared as in Example 1) and 1.42 parts of a sieved silicone resin powder, which contained no platinum catalyst.

COMPARISON EXPERIMENT 2

The procedure was carried out as in Comparison Experiment 1, with the exception that no silicone resin powder was added.

The viscosity of the organopolysiloxane mixture C from the Comparison Experiments 1 and 2 (measured immediately after the preparation) was comparable with that of Example 1 and the hardness (Shore A) of the test sample cured for 20 minutes at 175° C. corresponded to that of Example 1. However, in contrast to Example 1, the organopolysiloxane mixtures from Comparison Experiments 1 and 2 were already crosslinked after less than 3 hours of storage.

What is claimed is:

1. Thermosetting organopolysiloxane mixtures, with good storage stability at room temperature, which are settable by addition of a silicon bonded hydrogen to an unsaturated carbon to carbon bond, said mixture containing
   at least one organopolysiloxane having in each molecule at least two unsaturated monovalent hydrocarbon moieties bonded to the silicon atom,
   at least one organohydrogenpolysiloxane having in each molecule at least two hydrogen atoms bonded to the silicon atom, and
   a catalyst amount of platinum or a platinum compound finely dispersed in a solid silicone resin at a concentration of 0.01-5%, by weight calculated as platinum metal and based on the total weight of catalyst and solid resin, wherein the solid platinum-containing catalyst material has a melting point or softening point between 70° and 250° C., is practically imiscible with the organopolysiloxane and organohydrogenpolysiloxane mixture below the melting point or the softening point, and is finely dispersible therein.

2. Thermosetting organopolysiloxane mixtures according to claim 1 wherein said silicone resin contains unsaturated hydrocarbon moieties.

3. Thermosetting organopolysiloane mixtures according to claim 2 wherein said silicon resin contains vinyl moieties.

4. Thermosetting organopolysiloxane mixtures according to claim 1 wherein said solid substance in the platinum-containing catalyst material is a non-silicon organic substance.

5. Thermosetting organosiloxane mixtures according to claim 1 further comprising a filler, a pigment, a dispersing auxiliary and an adhesion promoting auxiliary.

* * * * *